United States Patent [19]

Okamoto et al.

[11] Patent Number: 4,804,506

[45] Date of Patent: Feb. 14, 1989

[54] METHOD FOR MANUFACTURING MULTIHARDNESS FOAMED ARTICLES

[75] Inventors: Tsuneyuki Okamoto, Okayama; Yasuyuki Toda, Kurashiki; Mitsuo Katayama, Okayama; Yasumasa Senoh, Kurashiki, all of Japan

[73] Assignee: Namba Press Works Co., Ltd.,, Kurashik, Japan

[21] Appl. No.: 68,144

[22] Filed: Jun. 29, 1987

[30] Foreign Application Priority Data

Jul. 4, 1986 [JP] Japan ................................. 61-155983

[51] Int. Cl.4 ............................................. B29C 67/22
[52] U.S. Cl. ........................................ 264/45.1; 264/53
[58] Field of Search .................... 264/45.1, 46.4, 46.6, 264/53

[56] References Cited

U.S. PATENT DOCUMENTS

| | | | |
|---|---|---|---|
| 3,327,029 | 6/1967 | Pincus et al. | 264/46.6 |
| 3,435,101 | 3/1969 | Boorman | 264/46.6 |
| 3,872,199 | 3/1975 | Ottinger | 264/46.4 |
| 4,405,681 | 9/1983 | McEvoy | 264/46.4 |

FOREIGN PATENT DOCUMENTS

| | | | |
|---|---|---|---|
| 59-11229 | 1/1984 | Japan | 264/46.6 |
| 61-144315 | 7/1986 | Japan | 264/45.1 |

Primary Examiner—Jan H. Silbaugh
Assistant Examiner—Allan R. Kuhns
Attorney, Agent, or Firm—Renner, Kenner, Greive Bobak, Taylor & Weber

[57] ABSTRACT

A method for manufacturing a multihardness foamed article, including the steps of, placing a mold for foaming such that its bottom surface is inclined with respect to the horizontal plane, pouring a first liquid formulation which will form a portion having a certain hardness designed to constitute the surface area of the foamed article at or adjacent to a higher point of the inclined bottom surface, and allowing the formulation to flow and spread over the entire bottom surface as a continuous thin layer while sticking at its undersurface to the bottom surface, immediately after pouring of the first formulation, pouring a second liquid formulation which will form another portion of another hardness designed to constitute a portion other than the surface area of the foamed article at or adjacent to the higher point, and allowing the second formulation to flow and spread over the flowing and spreading first formulation as a second continuous thin layer which will not commingle with the first layer, and allowing these two layers to foam and cure respectively in a contiguous but independent state to form the multihardness foamed article which has a clear and distinct common boundary defined between portions of different hardness and is combined unitarily along the common boundary. A third liquid formulation which will form a portion of yet another hardness designed to constitute yet another portion of the foamed article may be poured at or adjacent to the higher point or onto side recesses of the mold, and allowing the third formulation to flow and spread over the flowing and spreading second formulation as a third continuous thin layer which will not commingle with the second layer.

14 Claims, 4 Drawing Sheets

METHOD FOR MANUFACTURING MULTIHARDNESS FOAMED ARTICLES

TECHNICAL FIELD

The present invention relates to a method for manufacturing a multihardness foamed article.

BACKGROUND ART

In the past, laminated foam cushions composed of two or more foams of different hardness have been known and utilized as, for example, in vehicle seats.

Among many methods for preparing such multilayer or multihardness foam cushions, the first one involves foaming different foams of different hardness in separate molds, cutting respective foams into required shapes and dimensions, piling up various cut foams and bonding the same together to form a unitary foam cushion. This method is extremely time and labor consuming in that it requires separate molding and foaming steps, cutting steps and bonding steps; and, moreover, the products of this method cannot be expected to have high quality and be comfortable.

The second method in the prior art involves preparing a first foam of first hardness, placing the same in a mold, pouring the second stock of second hardness onto the first foam and causing the stock to foam thereat to thereby produce a multihardness unitary foam article. The second method is also disadvantageous in that it is time consuming and it cannot define, as intended, a clear and distinct interface or boundary between different layers of different hardness.

The third method is described in U.S. Pat. No. 3,257,149 issued June 21, 1966 which utilizes partitions in the mold to prevent two or more foaming formulations from admixing with each other. This method has widely been employed in the industry and deemed conventional.

Well advanced as compared to the prior methods as mentioned above, the fourth one is a method described in Japanese Laid-Open Publication No. 96195/80 "Multidensity Foam Article and Method of Preparation" (Application No. 123753/79). Briefly, this method is shown in FIG. 10 attached hereto and comprises partially filling a mold a having a lid b with a first formulation c which will yield a firm foam having a high modulus, allowing this formulation to foam to some extent, then pouring onto the foaming first formulation c a second formulation d which will yield a soft foam having a low modulus. The second formulation d which is a liquid and of higher density passes through the foaming first formulation c of lower density to the bottom surface of the mold a. Thus, the foaming first formulation c floats upon the second formulation d. The lid b is closed and both formulations c and d are allowed to foam, rise to fill the entire mold, and cure to thereby produce a composite foam article as shown in FIG. 11 which has a firm foam C and a soft foam D joined together. For use as a seat cushion, the article shown in FIG. 11 will be inverted 180° with the soft foam D on top and firm foam C on the bottom. The inverted cushion will have an upper surface U and a bottom or rear surface R. This type of cushion is purported to have comfortableness and supportiveness owing to its structure comprising the soft, comfortable foam on the top and the firm, supportive foam on the bottom. However, some defects and disadvantage are found in this cushion made according to the fourth method.

(1) While a major portion of the first foaming formulation yielding a firm portion floats upon the liquid second formulation, a thin membrane of the first foaming formulation remains stuck to the bottom surface of the mold. Upon completion of foaming and curing, this sticking membrane produces a thin firm layer C' on the upper surface U as shown in FIG. 11. This firm layer C' is an undesirable product and spoils comfortableness, supporting and fitting feelings intended to be produced by the soft layer D. Uncomfortable vehicle seats do not assure good safety and may lead to traffic accidents.

(2) The second liquid formulation d poured after the first formulation starts to foam penetrates the foaming formulation and sinks toward the bottom. A trace of the second formulation remaining in the first formulation may produce flaws D' on the rear surface R as shown in FIG. 11. This degrades appearance of the foamed article.

(3) Also, the second formulation poured afterwards may break yielding cells in the first formulation which leads to degradation of the firm portion C' of the finished article.

(4) The two portions C and D are not sufficiently strongly bonded together along their boundary because time interval between the first and second pouring is large and the consistencies of the first and second formulations become different from each other.

(5) Waiting intervals are necessary between the first and second pouring, e.g. 30 seconds or more, and this amounts to large time losses in the overall production lines and may require a large number of automated systems.

DISCLOSURE OF THE INVENTION

Accordingly, it is an object of the invention to provide a method for manufacturing a multihardness foamed article which has a clear and distinct boundary or interface defined between portions of different hardness, and can enjoy as high comfortableness as intended, good supportive and fitting feelings, as well as good appearance and high quality. The method of this invention can achieve shorter production time than the prior art methods and requires less expensive production facilities than the prior one.

In brief, the method of the present invention comprises holding a mold for foaming with its bottom surface inclined with respect to the horizontal plane, and pouring a plurality of liquid formulations yielding, respectively, different hardness portions of foamed article successively without substantial time intervals on the same or substantially the same higher point of the inclined bottom surface of the mold. The different formulations poured successively are allowed to flow and spread over the entire bottom surface as distinct layers which will not commingle with each other. The different distinct layers are allowed to foam and cure simultaneously to yield a unitary foamed article having clear and distinct boundaries between portions of different hardness.

"Successively without substantial time intervals" herein means that the formulation poured first is not given time for substantial foaming before pouring a succeeding formulation. Practically, only 0–7 seconds are permitted between successive pourings in the present invention. This time interval is called "creaming time".

In the past, it was commonly believed that two or more liquid formulations, if poured successively one over the other, would commingle with each other and would not define in any way an interface therebetween. Applicants challenged this commonly believed thought, and after extensive studying and efforts, have found that, if pourings of different formulations are conducted successively without substantial time intervals, they do not commingle with each other and do define clear and distinct interfaces between distinct and independent layers which, respectively foam and cure leaving clear and distinct boundaries as intended to yield a unitary foamed article.

In the present invention, it is desirable that the bottom surface of the mold on which foamings take place is slightly tilted with respect to the horizontal plane. Although it is noted that formulations poured even on a horizontal bottom would spread and extend around the point on which they are poured as distinct layers, but in this case, they do not spread uniformly in all directions. On the other hand, when the bottom surface is greatly tilted, e.g., more than 40 degrees, formulations poured thereon flow down too fast to form layers of uniform thickness and accumulate on the lower area of the inclined bottom surface. Accordingly, it is necessary that the bottom surface is inclined from about 4 degrees to less than 40 degrees with respect to the horizontal plane. Preferably, the bottom surface is inclined 4–20 degrees and most preferably 5–12 degrees.

It is noted that a liquid formulation poured on the inclined surface goes slightly upwards from the point on which it is poured while foaming and rising so that it can be said that the liquid formulation spreads over the entire bottom surface in all directions.

PREFERRED EMBODIMENT FOR CARRYING OUT THE INVENTION

Figure 1:
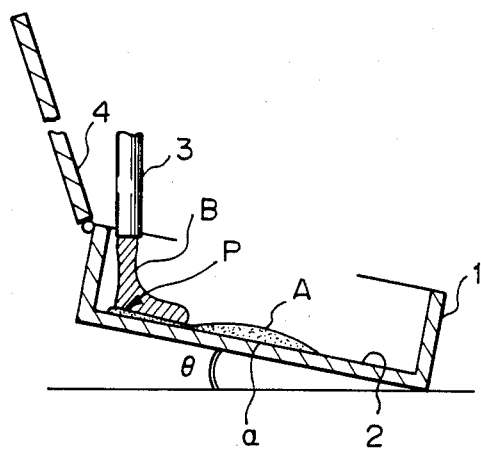
FIG. 1 is a schematic sectional end view showing pouring steps of the present invention.

Referring now to the drawings, the invention will be described in more detail.

Figure 2:
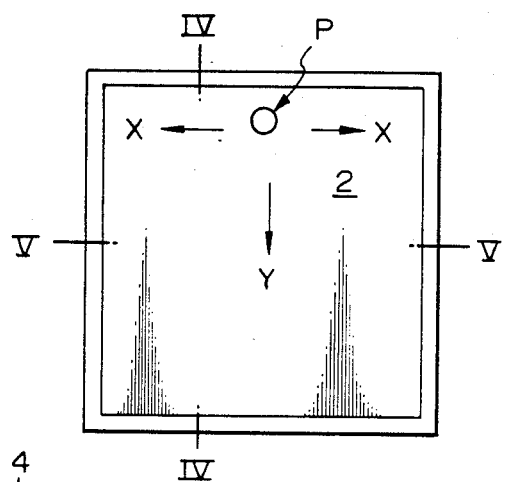
FIG. 2 is a plan view of a mold for foaming showing the point on which formulations are poured and the directions in which formulations are spreading on the mold.
Figure 3:
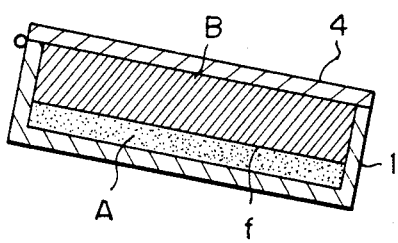
FIG. 3 is a sectional view of the closed mold showing foaming and rising of respective formulations.
Figure 4:
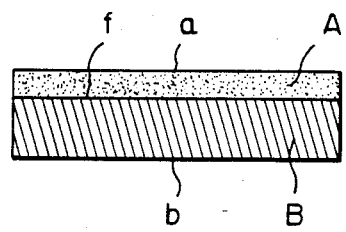
FIGS. 4 and 5 are sectional views of a foamed article obtained according to the present invention, respectively, taken substantially along the line IV—IV and the line V—V in FIG. 2.
Figure 5:
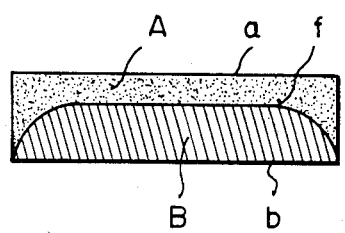

An embodiment of the invention is shown in FIGS. 1 through 5 in which FIG. 1 is a partly cut away sectional view showing the pouring steps of liquid formulations onto an inclined bottom surface; FIG. 2 is a plan view of the mold indicating a pouring point P and directions in which liquid formulations spread and extend; FIG. 3 is a sectional view of the closed mold in which two different hardness formulations have risen completely to fill the mold; FIG. 4 is a sectional view taken substantially along the line IV—IV in FIG. 2 showing a unitary foamed article taken out from the mold and inverted 180°, and FIG. 5 is a sectional view of the same article taken substantially along the line V—V in FIG. 2.

Now, the method of the present invention is illustrated in the following specific examples in conjunction with the drawings.

EXAMPLE I

An aluminum mold 1 having dimensions of 300×300×50 mm is provided as shown in FIGS. 1 and 2. The bottom surface 2 of the mold 1 is inclined at an angle $\theta$ ranging from 5 to 10 degrees with respect to the horizontal plane. The mold 1, especially its bottom 2, is preheated to a temperature of about 55° C. by using an electrical heater (not shown) and 90 g of a first liquid formulation A as below mentioned is poured onto a higher point P on the inclined bottom surface 2 by using a low pressure foaming machine, such as Type 600-2 machine sold by Shin Admiral Co., Ltd., Japan.

Operating conditions were: delivery rate at 13 kg/min., flow rate 1.8 m/sec., liquid temperature 22° C., liquid viscosity 500 cps.

Immediately after pouring the first formulation A, 180 g of a second liquid formulation B is poured over the same point P by using a low pressure foaming machine, such as Type MEG-MINI machine of Maruka Kakoki Co., Ltd., Operating conditions were: delivery rate 9 kg/min., flow rate 0.45 m/sec., liquid temperature 25° C., and liquid viscosity 800 cps.

The first formulation A is the below-mentioned composition.

| FIRST FORMULATION A (SOFT) | |
|---|---|
| Ingredients | Parts by weight |
| EXENOL 910[1] | 30 |
| EXENOL 832[2] | 70 |
| diethanol amine | .5 |
| water | 2.5 |
| TEDA[3] | .2 |
| L5309[4] | 1.0 |
| Ashahi Fron[5] | 5 |
| MTBL[6] | 37.2 |

Notes: [1]acrylonitrile copolymer polyether polyol (OH (OH value 28) manufactured by Asahi Glass Co., Ltd.
[2]polyether polyol (OH value 33) by Asahi Glass Co., Ltd.
[3]triethylene diamine by Toyo Soda Co., Ltd.
[4]silicon foam controlling agent by Nippon Unika Co., Ltd.
[5]fluorocarbon foaming agent by Asahi Glass Co., Ltd.
[6]isocyanate by MD Kasei Co. Ltd.

| Typical Properties of Foamed Article | |
|---|---|
| bulk density | 53 b/cm$^3$ |
| indentation load | 16 kg/314 cm$^2$ |
| surface hardness | 32° |
| (Type F Rubber Tester) | |

| SECOND FORMULATION B (FIRM) | |
| --- | --- |
| Ingredients | Parts by weight |
| EXENOL 910[1] | 30 |
| EXENOL 832[2] | 70 |
| diethanol amine | 2 |
| water | 2.1 |
| TEDA[3] | .2 |
| L 5309[4] | .5 |
| TDI 80[7] | 9.1 |
| HSQ 730[8] | 36.2 |

Notes:  [1]-[4] are same as in A
[7] tolylene diisocyanate by Sumitomo Bayer Co., Ltd.
[8] tolylene diisocyanate prepolymer by Mitsui Toatsu Chemical Co., Ltd. (free isocyanate 29.6%)

| Typical Properties of Foamed Article | |
| --- | --- |
| bulk density | .067 g/cm$^3$ |
| Indentation load | 46 kg/314 c$^2$ |
| surface hardness (Type F Rubber Tester) | 80° |

In FIGS. 1 and 2, the first liquid formulation A spreads over the entire bottom surface 2, i.e., in the directions X and Y as well as in the upward direction from the point P. The undersurface a of the flowing and spreading first formulation A sticks to the bottom surface 2 while extending itself as a continuous layer.

On this liquid later A, the second liquid formulation B is poured at the same higher point P by the same inlet tube 3 as previously used for the first formulation A. The second formulation B has substantially the same density as that of the first formulation A. The second liquid formulation B spreads over the first formulation A which is now in the form of a thin layer continually extending in all directions. The second formulation B spreads in substantially the same manner and directions as those of the first formulation A.

While spreading and extending, both formulations start to foam slightly. As the time interval between the first and second pourings is very short, e.g., from 0 to 3 seconds, the two formulations A and B remain at substantially the same density level, and because of the surface tensions exhibited by the respective formulations, a clear and distinct interface is defined between the two layers of formulations. Surprisingly, the two formulations will not be admixing with each other and spread respectively as separate and contiguous layers the full extent of the mold.

In FIG. 3, the lid 4 is closed against the mold 1 and fastened by an appropriate clamp means (not shown). In these conditions, the formulations A and B are allowed to foam, rise and cure for a period of about 5 minutes to yield an intended multihardness foamed article which is composed of a soft portion A resulting from the first formulation and a firm portion B from the second formulation. These two portions A and B having different hardness respectively are strongly bonded together at a common boundary or interface f which is defined clearly and distinctly as intended.

In order to visually confirm this interface f, an appropriate blue tint may be added to the liquid second formulation B in contrast to yellowish color of the first formulation A upon foaming and curing.

After being taken out from the mold 1, the multihardness foamed article may be subjected to an ordinary crushing operation to make closed cells open and to a further curing operation.

The multihardness foamed article thus obtained is shown in cross sectional views in FIGS. 4 and 5. When viewed in longitudinal cross section in FIG. 4 (along the line IV—IV in FIG. 2), both layers of soft (A) and firm (B) portions have uniform thickness. In FIG. 5 taken along the widthwise direction of the foamed article, the soft portion A poured first is thickened at both sides and thinned in the central portion. Surface hardness measured by Type F Rubber Tester at the surface a of the portion A is 35° and 78° at the rear surface b.

Example I as described above can be varied such that the First Formulation yields a firm portion on the top and the Second Formulation yields a soft portion on the bottom of a foamed article.

EXAMPLE II

Figure 6:
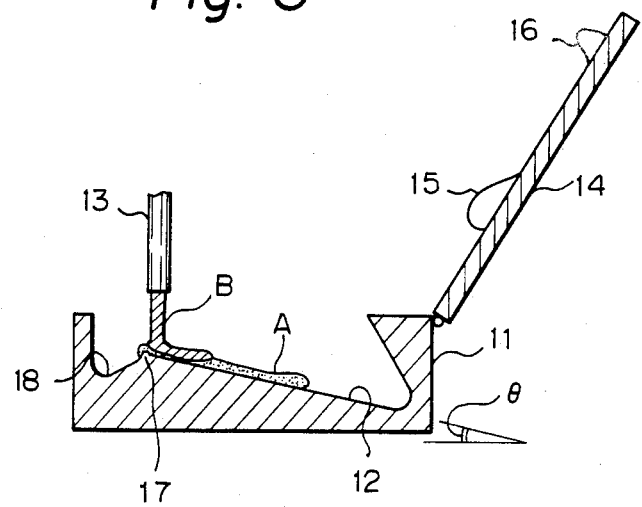
FIG. 6 is a sectional end view showing another embodiment of the present invention for manufacturing a 3-layer structure foamed article.

A second embodiment of the invention is illustrated in FIGS. 6–9. The mold 11 having the inner configuration as shown in FIG. 6 is heated to 50°–55° C. by means of a hot air circulator (not shown). The mold 11 is held with its major bottom surface 12 tilted to an angle $\theta$ ranging from 7°–12°.

A type MEG-HK 650 high pressure foaming machine with four-component-MQ heads sold by Maruka Kakoki Co., Ltd. was employed. This machine was adapted such that a single inlet 13 can be connected to either side A or side B of the machine and different formulations can be continuously poured through the single inlet 13 by controlling values without any intermission.

A Third Formulation as mentioned below is employed as a first liquid formulation A and assigned to side A of the machine, and a Fourth Formulation as mentioned below is assigned to side B of the machine as a second liquid formulation B.

| THIRD FORMULATION (SOFT) | |
| --- | --- |
| Ingredients | Parts by weight |
| EP 30-33[9] | 60 |
| POP 31-28[10] | 40 |
| water | 3.6 |
| diethanol amine | 1.5 |
| TEDA[3] | .13 |
| NIAX A-1[11] | .1 |
| SRX 274C[12] | 1.0 |
| SUMIJULE VT 80[13] | 48.5 |

Notes:  [3] is the same as in EXAMPLE I
[9] Polyether Polyol (OH value 33) by Mitsui Toatsu Chemical Co., Ltd.
[10] acrylonitrile polymeric polyether polyol (OH value 28) by Mitsui Toatsu Chemical Co., Ltd.
[11] amine catalyst by UCC
[12] silicon foam controlling agent by Toray Silicones
[13] isocyanate by Sumitomo Bayer Urethane

| Typical Properties of Foamed Article | |
| --- | --- |
| bulk density | .044 g/cm$^3$ |
| indentation load | 20 kg/314 cm$^2$ |
| surface hardness (Type F Rubber Tester) | 48° |

| FOURTH FORMULATION (FIRM) | |
| --- | --- |
| Ingredients | Parts by weight |
| EP 30-33[9] | 35 |
| POP 31-28[10] | 65 |
| water | 3.5 |
| diethanol amine | 2 |
| TEDA[3] | .13 |

-continued

| FOURTH FORMULATION (FIRM) | |
|---|---|
| niax A-1[11] | .1 |
| L5309[4] | 1 |
| blue tinting agent | .1 |
| SUMIJULE | 49.2 |

Notes: [3][4][9][10][11][13] are the same as in previous notes.

Typical Properties of Foamed Article

| bulk density | .045 g/cm$^3$ |
|---|---|
| indentation load | 30 kg/314 cm$^2$ |
| surface hardness (Type F Rubber Tester) | 75° |

Figure 7:
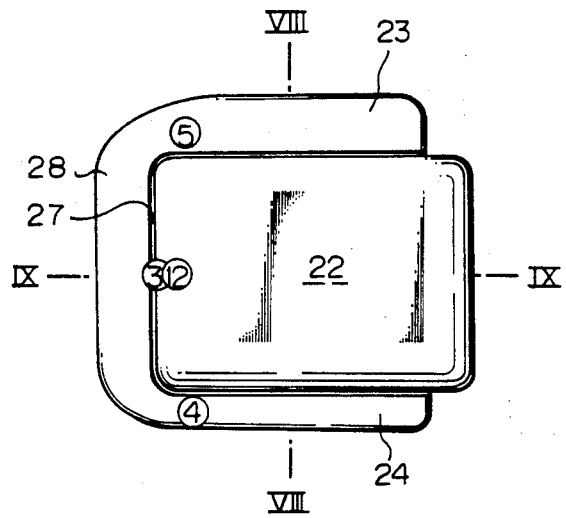
FIG. 7 is a plan view of a foamed article indicating points of several pourings by encircled numerals.

Referring now to FIG. 6, the inlet 13 is positioned over the point slightly inside a rib 17 formed on the apex of the inclined bottom surface 12. 280 g of a first liquid formulation A (Third Formulation) is poured from the inlet 13 through side A of the machine mentioned above with 180 kg/min. delivery rate, 1.1 m/sec. flow rate, 28° C. liquid temperature, and 500 cps liquid viscosity. Immediately, 280 g of the second formulation B (Fourth Formulation) is discharged through side B of the same machine with 18 kg/min delivery rate, 1.1 m/sec flow rate, 30° C. liquid temperature and 800 cps liquid viscosity. As shown in FIG. 7 which shows a foamed seat cushion in plan view by numerals in circles, the first pouring and the second pouring (1 and 2 in a circle) are made at the identical point on the bottom surface.

About 3 seconds later, 120 g of the first formulation A (Third Formulation) again through side A of the machine is poured by the inlet 13 moved about 7 mm upward from the first and second pouring point. This is shown in FIG. 7 by encircled numeral 3. Following this, 190 g and 220 g each of the second formulation B (Fourth Formulation) are discharged through side B of the machine onto both side parts of the mold as shown by encircled numerals 4 and 5 in FIG. 7.

It is imporatnt in the present invention that the different formulations such as A, B and A constituting at least a central sitting portion 22 (FIG. 7) of the seat cushion be poured into the mold successively without substantial time intervals, and that they spread, as distinct layers not commingling with each other, over the entire bottom surface in the same directions and to the same extent. In this connection, reaction rates, consistencies and other properties of the respective formulations as well as the points at which the respective formulations are poured must carefully be chosen and determined.

Upon completion of all requisite pourings, an upper half 14 of the mold is closed and fastened against the lower half 11 by means of a clamp (not shown). Different layers of different formulations are allowed to foam, rise and cure in the closed mold for about 5 minutes to form a unitary multihardness foamed article. After taken out from the mold, the article is subjected to a crushing operation to make the closed cells open.

Figures 8, 9:
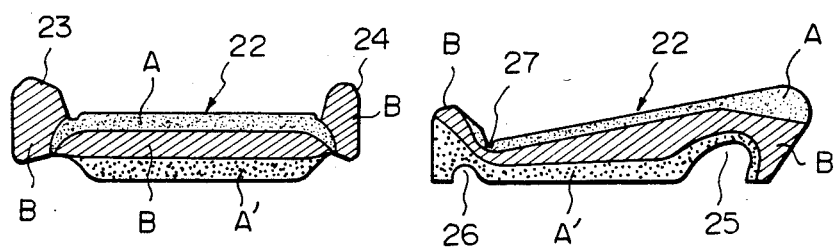
FIGS. 8 and 9 are sectional views respectively taken along the line VIII—VIII and the line IX—IX in FIG. 7.
Figure 10:
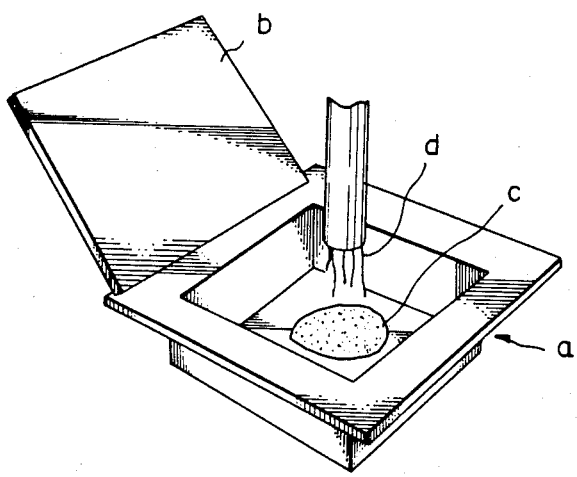
FIG. 10 is a perspective view explaining one of the prior art methods.
Figure 11:
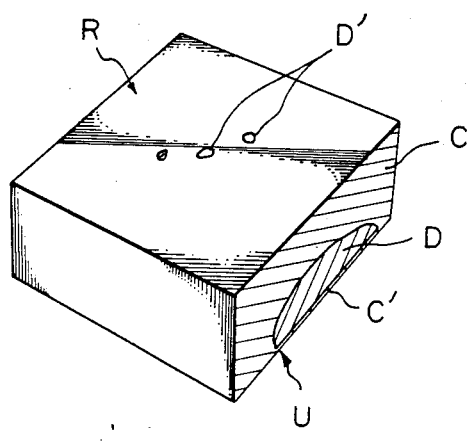
FIG. 11 is a perspective view partly cut away of the product of the prior art method of FIG. 10.

The article thus obtained, i.e., a seat cushion for a vehicle, is shown in FIGS. 7, 8 and 9. The central sitting portion 22 of the seat has the same configuration as that of the mold bottom surface 12 and side portions 23 and 24 have configurations formed by recessed side portions (not shown) of the mold. A rear protrusion 28 is formed by a rear recessed portion 18 of the mold. Slot 27 surrounding the central portion 22 is formed by the rib 17 formed around the mold bottom surface 12.

As seen from FIGS. 8 and 9, the central sitting portion 22 has a 3-layer-structure of soft portion A, firm portion B and soft portion A' defining therebetween clear and distinct interfaces and strongly bonded together therealong. The soft portion A' has the same composition as that of A, but the former is the one poured thirdly as described above. The seat cushion is provided on its undersurface with recesses 25 and 26 corresponding to the protrusions 15 and 16 on the upper mold half 14.

Surface hardnesses measured by Type F Rubber Tester are 48° on the surface of the portion A, 49° on the opposite rear surface of the portion A' and 68° at the interface between A and B (25 mm from the surface of A).

Using substantially the same procedure as in EXAMPLE II, a foamed article having firm (B)—soft (A)—firm (B) structure can be easily obtained.

EXAMPLE III

In this example, a polyurethane foam stock system H 255/H 210 manufactured by Sumitomo Bayer Urethane Co., Ltd. was employed. This system is commercially available as the so called "ALL MDI Cold Cure Urethane Foam Stock", its H 255 being mixture of polyester polyol with foaming catalyst and so on H, 210 being isocyanate comprising mainly diphenylmethane diisocyanate. By varying the ratio of H 255 and H 210 in this system, hardness of the foamed article to be obtained can be freely and easily changed.

Table I shows typical ratios of the two components H 255 and H 210 and corresponding properties, though unlimited changes in ratio and properties are practically available.

TABLE I

| Component | Ratio 1 | Ratio 2 | Ratio 3 |
|---|---|---|---|
| H 255 | 100 | 100 | 100 |
| H 210 | 46 | 51 | 56 |
| Properties of Foam | | | |
| density (g/cm$^3$) | .053 | .053 | .053 |
| indentation load (kg/314 cm$^2$) | 19 | 27 | 34 |
| surface hardness (Type F Rubber Tester) | 37 | 58 | 78 |

The same mold 11 as in EXAMPLE II was used, adjusted to the mold temperature of 53°–58° C. and held with its bottom surface 12 inclined 5°–12°. Type MEG-HK 430 Foaming Machine with MQ head sold by Maruka Kakoki Co., Ltd. was utilized. This machine is adapted to freely vary the output of H 210 isocyanate while pouring or during intervals between pourings. Thus, it is possible to shift continuously from Ratio 1 to Ratio 2 or from Ratio 3 to Ratio 1 or the like. Moreover, this machine can provide smooth flow of stocks without splashing.

In operation, 24 g of Ratio 1 stock was poured on the higher point of the inclined bottom surface with conditions of delivery rate at 18 kg/m, liquid velocity at 1.1 m/sec, liquid temperature at 28° C. and liquid viscosity at 700 cps and, then without any intervals, 240 g of Ratio 1 and 120 g of Ratio 3 stock were poured over the same point. Next, 160 g and 240 g each of Ratio 3 stocks were respectively poured onto side recesses of the mold. Stocks forming separate and distinct layers are allowed to foam and cure in the closed mold in the same manner as in EXAMPLE II and subjected to crushing operation.

The foamed article thus obtained had surface hardness of 38° at the upper surface, 55° at 20 mm depth from the upper surface, respectively. Surface hardness at the rear surface was 75°.

Pouring of Ratio 3, Ratio 2 and Ratio 1 stocks in this order as well as in another order can also be made in EXAMPLE III.

In the present invention, high quality foamed articles defining clear and distinct boundaries as intended and strongly bonded together therealong can easily and economically be obtained by pouring concurrently without substantial time intervals a plurality of liquid formulations having selected hardness or modulus with no fear of any operational troubles caused by differences in foaming and curing rates, density and so on of the different formulations.

The multihardness foamed article according to the present invention can be widely utilized as vehicle seat cushions as well as home furniture and office furniture such as beds, sofas, arm chairs, mats, and so on in various combinations of soft and firm or hard portions in unitary foamed articles.

Contrary to commonly believed concepts, the present invention makes it possible to pour two or more liquid formulations of different hardness and modulus successively without substantial time intervals, with the successful result of yielding a unitary foamed article having a clear and distinct interface defined between portions of different hardness which are bonded together along the common interface strongly by chemical reactions occurring during the course of curing. The concurrent pouring of different formulations can prevent any sink marks, flaws or other defects from being made in any portions of the foamed article so as to achieve high comfortableness, supportive and fitting feelings as intended.

The present invention can eliminate any time losses in the overall production lines and can attain shorter production time and can use smaller production facilities.

We claim:

1. A method for manufacturing a multihardness foamed article comprising the steps of:
   providing a closable mold having its bottom surface inclined with respect to the horizontal plane,
   pouring a first liquid formulation onto a point on a higher portion of said inclined bottom surface of the mold through an inlet means,
   pouring, immediately after pouring of said first formulation and before substantial foaming of said first formulation takes place, a second liquid formulation having substantially the same density, onto substantially the same point and through the same inlet means as the first liquid formulation, while allowing said first formulation to flow and spread in all directions over the entire bottom surface of the mold as a continuous first layer sticking at its undersurface to said bottom surface,
   allowing said second liquid formulation to form a second layer overlying said first layer and flowing and spreading over said first layer in substantially the same directions as the first layer such that the second layer will not commingle with said first layer, and
   closing said mold and allowing these two layers to foam and cure substantially concurrently in the closed mold to form a multihardness foamed article having a surface portion of a certain hardness resulted from said first formulation and another portion of another hardness resulted from said second formulation, these two portions being combined together integrally along a clear and distinct common boundary defined therebetween.

2. The method as claimed in claim 1 wherein said first liquid formulations is a composition which will form a soft portion of the foamed article, and said second liquid formulation is a composition which will form a firm or hard portion of the foamed article.

3. The method as claimed in claim 1 wherein said first liquid formulation is a composition which will form a firm or hard portion of the foamed article, and said second liquid formulation is a composition which will from a soft portion of the foamed article.

4. The method as claimed in claim 1 wherein said bottom surface of the mold is inclined 4–40 degrees with respect to the horizontal plane.

5. The method as claimed in claim 1 wherein said bottom surface of the mold is inclined 4–10 degrees with respect to the horizontal plane.

6. The method as claimed in claim 1 wherein said bottom surface of the mold is inclined 5-12 degrees with respect to the horizontal plane.

7. A method for manufacturing a multihardness foamed article, comprising the steps of:
   providing a closable mold having its bottom surface inclined with respect to the horizontal plane,
   pouring a first liquid formulation onto a point on a higher portion of said inclined bottom surface of the mold through an inlet means,
   pouring, immediately after pouring of said first formulation and before substantial foaming of said first formulation takes place, a second liquid formulation having substantially the same density, onto substantially the same point and through the same inlet means, as the first liquid formulation, while allowing said first formulation to flow and spread in all direction over the entire bottom surface of the mold as a continuous first layer sticking at its undersurface to said bottom surface,
   pouring, again immediately after pouring of said second formulation and before substantial foaming of said second liquid formulation takes place, a third liquid formulation having substantially the same density, onto substantially the same point and through the same inlet means, as the first and second liquid formulation, while allowing said second and third liquid formulation to form second and third layers overlying said first and second layers and flowing and spreading over said first and second layers, respectively in substantially the same directions as the first formulation such that the second and third layers will not commingle with each other,
   closing said mold and allowing said three layers to foam and cure substantially concurrently in the closed mold to form a multihardness foamed article having a surface portion of a certain hardness resulted from said first formulation, another portion of another hardness resulted from said second formulation, and yet another portion of yet another hardness resulted from said third formulation, adjacent two portions of these three portions being combined together integrally along a clear and distinct common boundary defined therebetween.

8. The method as claimed in claim 7 wherein said first and third formulations are compositions which will constitute softer portions than that of said second formulation.

9. The method as claimed in claim 7 wherein said first and third formulations are compositions which will constitute firmer portions than that of said second formulation.

10. The method as claimed in claim 7 wherein said first formulation constitutes a softer portion of the foamed article than that of said second formulation which, in turn, constitutes a softer portion than that of said third portion.

11. The method as claimed in claim 7 wherein said first formulation constitutes a firmer portion of the foamed article than that of said second formulation which, in turn, constitutes a firmer portion than that of said third portion.

12. The method as claimed in claim 7 wherein said bottom surface of the mold is inclined 4-40 degrees with respect to the horizontal plane.

13. The method as claimed in claim 7 wherein said bottom surface of the mold is inclined 4-20 degrees with respect to the horizontal plane.

14. The method as claimed in claim 7 wherein said bottom surface of the mold is inclined 5-12 degrees with respect to the horizontal plane.

* * * * *

UNITED STATES PATENT AND TRADEMARK OFFICE
CERTIFICATE OF CORRECTION

PATENT NO. : 4,804,506

DATED : February 14, 1989

INVENTOR(S) : Tsuneyuki Okamoto, Yasuyuki Toda, Mitsuo Katayama, and Yasumasa Senoh It is certified that error appears in the above-identified patent and that said Letters Patent is hereby corrected as shown below:

Cover page, [73], "Kurashik" should read --Kurashiki--.

Column 1, line 16, "foaming" should read --forming--.

Column 5, line 26, "a" should read --$\underline{a}$--.

Column 6, line 9, "a" should read --$\underline{a}$--.

Column 6, line 10, "b" should read --$\underline{b}$--.

Column 8, lines 23 and 24, "polyester" should read --polyether--.

Column 8, line 24, "on H," should read --on, H--.

Column 10, line 4, "formulations" should read --formulation--.

Column 10, line 36, "direction" should read --directions--.

Signed and Sealed this

Eighteenth Day of February, 1992

*Attest:*

HARRY F. MANBECK, JR.

*Attesting Officer*     *Commissioner of Patents and Trademarks*